(12) United States Patent
Xia et al.

(10) Patent No.: US 10,747,232 B2
(45) Date of Patent: Aug. 18, 2020

(54) METHOD AND DEVICE FOR DRAWING ROOM LAYOUT

(71) Applicant: Beijing Xiaomi Mobile Software Co., Ltd., Beijing (CN)

(72) Inventors: Yongfeng Xia, Beijing (CN); Ke Wu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 232 days.

(21) Appl. No.: 15/962,615

(22) Filed: Apr. 25, 2018

(65) Prior Publication Data
US 2018/0307243 A1    Oct. 25, 2018

(30) Foreign Application Priority Data
Apr. 25, 2017    (CN) .......................... 2017 1 0278735

(51) Int. Cl.
*G05D 1/02*    (2020.01)
*G01C 21/20*    (2006.01)
*G06K 9/00*    (2006.01)

(52) U.S. Cl.
CPC ......... *G05D 1/0274* (2013.01); *G01C 21/206* (2013.01); *G06K 9/00805* (2013.01); *G05D 2201/0203* (2013.01)

(58) Field of Classification Search
CPC ......... G05D 1/0274; G05D 2201/0203; G01C 21/206; G06K 9/00805
See application file for complete search history.

(56) References Cited

U.S. PATENT DOCUMENTS

2006/0095170 A1    5/2006    Yang et al.
2009/0226113 A1    9/2009    Matsumoto et al.
(Continued)

FOREIGN PATENT DOCUMENTS

CN    105320140 A    2/2016
CN    105511478 A    4/2016
(Continued)

OTHER PUBLICATIONS

Partial European Search Report dated Sep. 24, 2018 in European Patent Application No. 18168575.1, citing documents AA, AB and AX therein, 13 pages.
(Continued)

*Primary Examiner* — Todd M Melton
(74) *Attorney, Agent, or Firm* — Oblon, McClelland, Maier & Neustadt, L.L.P.

(57) ABSTRACT

The present disclosure relates to a method and a device for drawing a room layout. The method includes obtaining a sweeping path graph of a sweeping robot, the sweeping path graph comprising positions of N first obstacles and shapes and positions of M second obstacles encountered by the sweeping robot when sweeping a room, a bottom area of each of the N first obstacles being less than or equal to a first preset threshold, a bottom area of each of the M second obstacles being greater than or equal to a second preset threshold, wherein N and M are integers greater than or equal to 0; determining Q pieces of furniture arranged in the room based on the positions of the N first obstacles and the shapes and the positions of the M second obstacles, wherein Q is an integer greater than or equal to 0 and less than or equal to (N+M); and marking the Q pieces of furniture on a plan of the room to generate the layout of the room.

13 Claims, 16 Drawing Sheets

(56) References Cited

U.S. PATENT DOCUMENTS

2013/0206177 A1 8/2013 Burlutskiy
2019/0025061 A1* 1/2019 Helmich ................ G05D 1/024

FOREIGN PATENT DOCUMENTS

| CN | 106564054 A | 4/2017 |
|----|----|----|
| CN | 106569489 A | 4/2017 |
| JP | 2004-33340 A | 2/2004 |
| JP | 2006-139525 A | 6/2006 |
| KR | 10-2007-0027840 A | 3/2007 |

OTHER PUBLICATIONS

Nor, N.S.M., et al., "Automatic 3D Space Initialization System Using Depth Camera and Catalogue Database", XP032652226, Proceedings of the 2014 International Conference on Advanced Mechatronic Systems IEEE, Aug. 10-12, 2014, pp. 209-214.

Combined Chinese Office Action and Search Report dated May 21, 2019 in Chinese Patent Application No. 201710278735.4 (with English translation and English translation of Category of Cited Documents), citing document AO therein, 11 pages.

Japanese Office Action dated Sep. 20. 2019 in Japanese Patent Application No. 2018-504987 (with English translation), citing documents AA, AP and AQ therein, 8 pages.

International Search Report and Written Opinion dated May 1, 2018 in PCT/CN2017/095522, citing documents AO through AR therein, 12 pages.

* cited by examiner

METHOD AND DEVICE FOR DRAWING ROOM LAYOUT

CROSS-REFERENCE TO RELATED APPLICATIONS

This application is based on and claims priority to Chinese Patent Application Serial No. 201710278735.4, filed with the State Intellectual Property Office of P. R. China on Apr. 25, 2017, the entire contents of which are incorporated herein by reference.

TECHNICAL FIELD

The present disclosure relates to the field of data processing technology, and more particularly, to a method and a device for drawing a room layout.

BACKGROUND

With rapid development of science and technology, more and more intelligent household appliances are introduced to millions of households, greatly improving comfort and convenience for people. For example, in order to reduce labors of sweeping a room, more and more people select to use a sweeping robot to sweep the room.

In the related art, in order to avoid furniture arranged in the room, the sweeping robot can scan an area that needs to be cleaned by infrared or ultrasonic to detect furniture that appears in a sweeping path. When sweeping the room, the sweeping robot can automatically turn when encountering the furniture, thus avoiding colliding with the furniture during a sweeping process.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for drawing a room layout. The method includes obtaining a sweeping path graph of a sweeping robot, the sweeping path graph comprising positions of N first obstacles and shapes and positions of M second obstacles encountered by the sweeping robot when sweeping a room, a bottom area of each of the N first obstacles being less than or equal to a first preset threshold, a bottom area of each of the M second obstacles being greater than or equal to a second preset threshold, wherein N and M are integers greater than or equal to 0; determining Q pieces of furniture arranged in the room based on the positions of the N first obstacles and the shapes and the positions of the M second obstacles, wherein Q is an integer greater than or equal to 0 and less than or equal to (N+M); and marking the Q pieces of furniture on a plan of the room to generate the layout of the room. In an example, the first preset threshold is less than the second preset threshold.

According to an aspect, determining the Q pieces of furniture arranged in the room based on the positions of the N first obstacles and the shapes and the positions of the M second obstacles includes: obtaining a distance between each of the N first obstacles within a preset distance based on the positions of the N first obstacles; obtaining sizes of S closed geometries formed by the N first obstacles based on the distances between each of the N first obstacles within the preset distance; determining sizes of M objects represented by the M second obstacles based on the shapes and the positions of the M second obstacles and a size of the room; and determining the Q pieces of furniture arranged in the room based on the sizes of the S closed geometries, the sizes of the M objects, and a preset furniture size database.

According to another aspect, determining the Q pieces of furniture arranged in the room based on the sizes of the S closed geometries, the sizes of the M objects, and the preset furniture size database includes: determining and displaying a plurality of options for each piece of furniture arranged in the room based on the sizes of the S closed geometries, the sizes of the M objects, and the preset furniture size database; receiving a selecting operation instruction, the selecting operation instruction comprising a specified option of each piece of furniture determined in the plurality of options of each piece of furniture; and determining the Q pieces of furniture arranged in the room based on the specified option of each piece of furniture.

According to yet another aspect, the method includes obtaining a panoramic scene picture of the room; and drawing the Q pieces of furniture arranged in the room on the panoramic scene picture to obtain a panoramic layout of the room.

Aspects of the disclosure also provide another method for drawing a room layout. The method includes marking positions of N first obstacles and shapes and positions of M second obstacles encountered when sweeping a room on a sweeping path graph, a bottom area of each of the N first obstacles being less than or equal to a first preset threshold, a bottom area of each of the M second obstacles being greater than or equal to a second preset threshold, wherein N and M are integers greater than or equal to 0; and sending the sweeping path graph marked with the positions of the N first obstacles and the shapes and positions of the M second obstacles to a terminal. In an example, the first preset threshold is less than the second preset threshold.

According to an aspect, marking the positions of the N first obstacles and the shapes and the positions of the M second obstacles encountered when sweeping the room on the sweeping path graph includes: when a number of times of encountering a reference obstacle when sweeping the room is greater than or equal to a preset number of times, obtaining a bottom area of the reference obstacle; when the bottom area of the reference obstacle is less than or equal to the first preset threshold, marking the reference obstacle as one of the N first obstacles on the sweeping path graph based on a position of the reference obstacle; and when the bottom area of the reference obstacle is greater than or equal to the second preset threshold, marking the reference obstacle as one of the M second obstacles on the sweeping path graph based on a shape of the reference obstacle and the position of the reference obstacle.

Aspects of the disclosure also provide a device for drawing a room layout. The device includes a processor and a memory configured to store instructions executable by the processor. The processor is configured to obtain a sweeping path graph of a sweeping robot, the sweeping path graph comprising positions of N first obstacles and shapes and positions of M second obstacles encountered by the sweeping robot when sweeping a room, a bottom area of each of the N first obstacles being less than or equal to a first preset threshold, a bottom area of each of the M second obstacles being greater than or equal to a second preset threshold, wherein N and M are integers greater than or equal to 0; determine Q pieces of furniture arranged in the room based on the positions of the N first obstacles and the shapes and the positions of the M second obstacles, wherein Q is an integer greater than or equal to 0 and less than or equal to (N+M); and mark the Q pieces of furniture on a plan of the room to generate the layout of the room.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of apparatuses and methods consistent with aspects related to the present disclosure as recited in the appended claims.

Technical solutions provided by aspects of the present disclosure relate to a terminal and a sweeping robot, in which, the terminal may be a mobile phone, a tablet computer, a smart watch and other devices that can be connected to the sweeping robot. The terminal and the sweeping robot may be connected with each other via infrared, Bluetooth or wireless communication network, and aspects of the present disclosure are not limited thereto. In the related art, when drawing a layout of a room, a size of each piece of furniture arranged in the room may be measured in sequence, and then an image of each piece of furniture are drawn on an original plan of the room according to a position of each piece of furniture. Therefore, a process of drawing the layout is tedious, and user experience is poor. In aspects of the present disclosure, the terminal can determine the furniture arranged in the cleaned room according to a sweeping path graph of the sweeping robot and obstacles marked on the sweeping path graph, improving convenience and accuracy of drawing the layout of the room, and improving user experience.

Aspects of the present disclosure provide a method for drawing a room layout, execution bodies of which include a terminal and a sweeping robot. Aspects of the present disclosure provide two methods implementing a cross-domain access according to different execution bodies, and the methods are described as follows.

Terminal Side

Figure 1A:
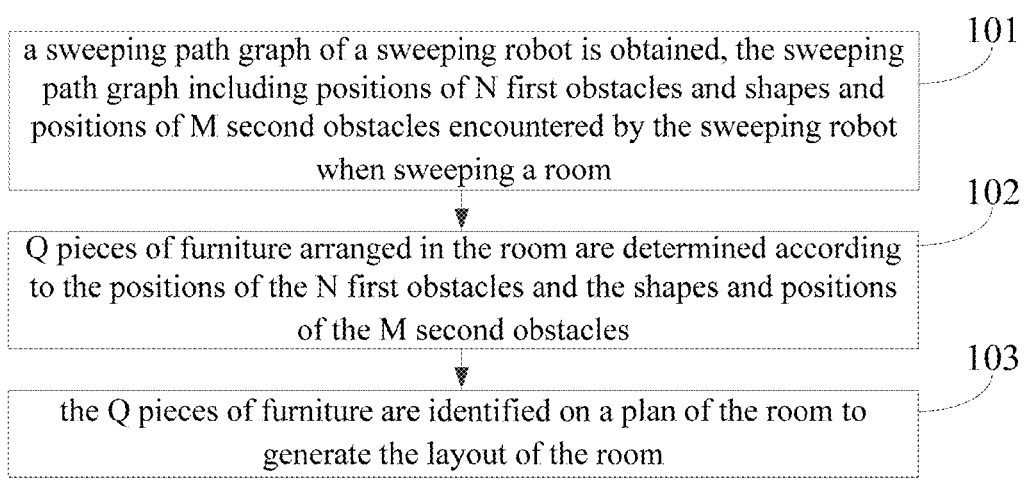
FIG. 1A is a flow chart illustrating a method for drawing a room layout according to an exemplary aspect of the present disclosure.

FIG. 1a is a flow chart illustrating a method for drawing a room layout according to an exemplary aspect. As illustrated in FIG. 1, the method for drawing the room layout is applied in the terminal, and includes block 101 to block 103.

In block 101, a sweeping path graph of a sweeping robot is obtained, in which, the sweeping path graph includes positions of N first obstacles and shapes and positions of M second obstacles encountered by the sweeping robot when sweeping a room.

A bottom area of the first obstacle is less than or equal to a first preset threshold, and a bottom area of the second obstacle is greater than or equal to a second preset threshold, where N and M are integers greater than or equal to 0.

In an exemplary aspect, the bottom area of the first obstacle may be a contact area of the first obstacle with the ground, and the bottom area of the second obstacle may be a contact area of the second obstacle with the ground. The sweeping robot can determine encountered obstacle through a path obstacle avoidance function in a process of sweeping the room, and then scan the obstacle through a sensor mounted thereon to determine a relative size proportion of the obstacle with respect to the sweeping robot, and further obtain the contact area of the obstacle with the ground, that is, the bottom area of the obstacle, according to the size of the sweeping robot. When the bottom area of the obstacle is less than or equal to the first preset threshold, the obstacle is identified as the first obstacle. When the bottom area of the second obstacle is greater than or equal to the second preset threshold, the obstacle is identified as the second obstacle.

In an exemplary aspect, the terminal can be connected with the sweeping robot via infrared, Bluetooth or wireless communication network, and receive the sweeping path graph sent by the sweeping robot. Alternatively, the sweeping robot may upload the sweeping path graph to a cloud server after obtaining the sweeping path graph, and the terminal can download the sweeping path graph from the cloud server when drawing the layout. Alternatively, the sweeping robot may send the sweeping path graph to another terminal after obtaining the sweeping path graph, and then this terminal forwards the sweeping path graph to the terminal that draws the layout.

In practical applications, the first preset threshold and the second preset threshold may be set according to specific situations, which is not limited in aspects of the present disclosure. Alternatively, the first preset threshold is less than the second preset threshold.

In block 102, Q pieces of furniture arranged in the room are determined according to the positions of the N first obstacles and the shapes and positions of the M second obstacles.

Q is an integer greater than or equal to 0 and less than or equal to (N+M).

In an exemplary aspect, the terminal can analyze the sweeping path graph after obtaining the sweeping path graph, and can obtain the positions of the N first obstacles and the shapes and positions of the M second obstacles included in the sweeping path graph. Since the bottom area of the first obstacle is small, the first obstacle may be considered as a supporting part of the furniture, such as a table leg, a stool leg and a sofa leg. According to the positions of the N first obstacles, a distance between each two first obstacles can be obtained, and then S pieces of furniture represented by the N first obstacles can be obtained. The bottom area of the second obstacle is big, and then the second obstacle can be considered as a piece of floor furniture, such as a floor bed, a floor table and a floor stool. According to the shapes and positions of the M second obstacles, M pieces of furniture represented by the M second obstacles can be obtained. A sum of S and M is Q.

In block 103, the Q pieces of furniture are marked on a plan of the room to generate the layout of the room.

In an exemplary aspect, at initialization, the terminal can obtain the plan of the room from the cloud server or the sweeping robot, the plan only shows walls, doors, windows and floors of the room. When the terminal determines the Q pieces of furniture arranged in the room, the terminal can mark the N first obstacles and the Q pieces of furniture represented by the M second obstacles on the plan of the room according to the positions of the N first obstacles and the shapes and positions of the M second obstacles, thus generating the layout of the room.

In technical solutions of aspects of the present disclosure, the terminal can determine the furniture arranged in the cleaned room according to the sweeping path graph of the sweeping robot and the obstacles marked on the sweeping path graph, improving convenience and accuracy of drawing layout of the room, and improving user experience.

Figure 1B:
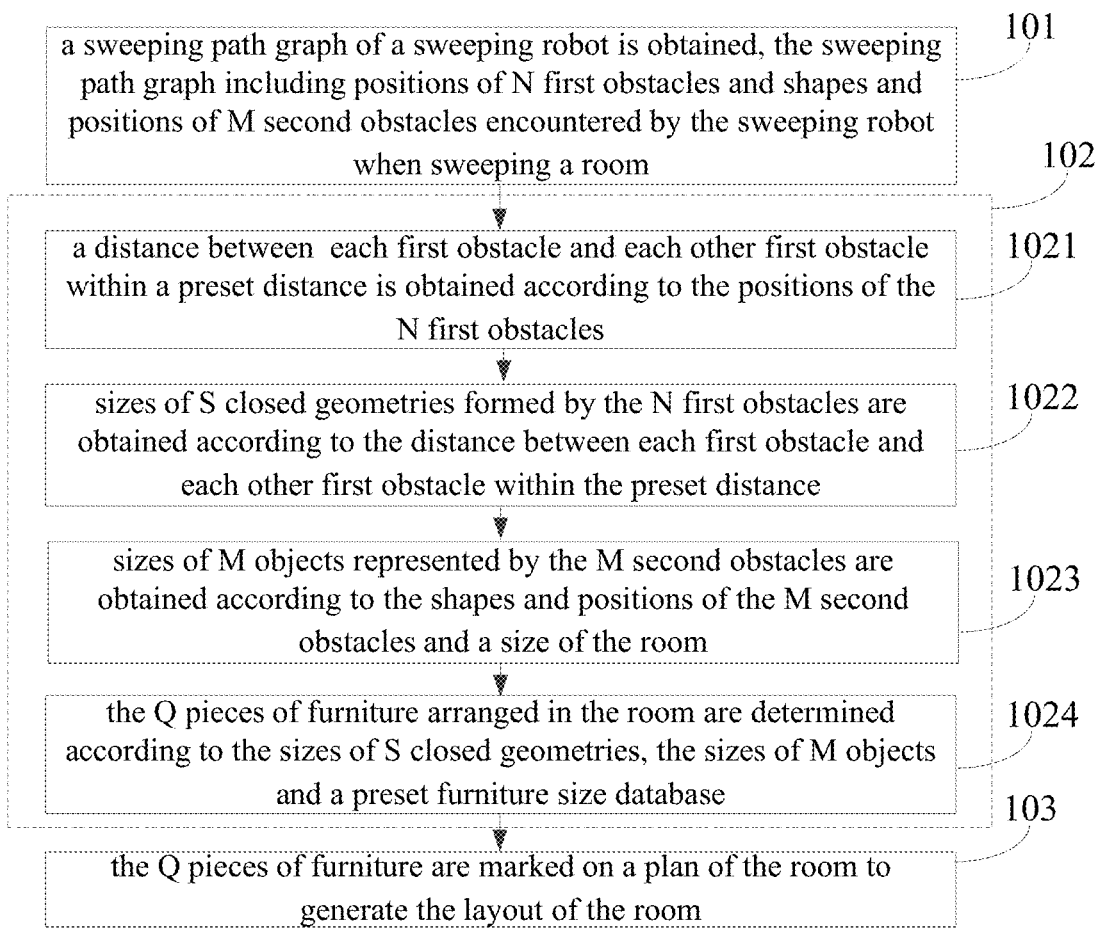
FIG. 1B is a flow chart illustrating a method for drawing a room layout according to an exemplary aspect of the present disclosure.

In an aspect, as illustrated in FIG. 1b, in block 102, determining Q pieces of furniture arranged in the room according to the positions of the N first obstacles and the shapes and positions of the M second obstacles can be implemented by block 1021 to block 1024.

In block 1021, a distance between each first obstacle and each other first obstacle within a preset distance is obtained according to the positions of the N first obstacles.

In block 1022, sizes of S closed geometries formed by the N first obstacles are obtained according to the distance between each first obstacle and each other first obstacle within the preset distance.

In block 1023, sizes of M objects represented by the M second obstacles are obtained according to the shapes and positions of the M second obstacles and a size of the room.

In block 1024, the Q pieces of furniture arranged in the room are determined according to the sizes of S closed geometries, the sizes of M objects and a preset furniture size database.

In an exemplary aspect, at initialization, the terminal can be provided with the preset distance and the preset furniture size database. The preset distance represents a maximum distance between respective supporting parts of most furniture, and the preset furniture size database describes various sizes of common furniture. For example, the size of common bed includes 1.2 m*2 m, 1.5 m*2 m, or 1.8 m*2 m, the size of common table includes 1 m*1.8 m or 0.8 m*1.35 m, and the size of common stool includes 0.3 m*0.4 m or 0.5 m*0.5 m.

After obtaining the positions of the N first obstacles, the terminal may obtain the distances between each of the N first obstacles and other first obstacles within the preset distance, and then obtain the sizes of S closed geometries formed by the N first obstacles according to the distances between each first obstacle and the other first obstacles within the preset distance.

Supposing the terminal obtains 4 first obstacles, that is, N is 4, and the 4 first obstacles include a first obstacle A, a first obstacle B, a first obstacle C and a first obstacle D. The preset distance is 1.5 m, that is, the terminal can obtain the distance between each first obstacle and each other first obstacle within 1.5 m. For example, the distance between each two of the first obstacle A, the first obstacle B, the first obstacle C, and the first obstacle D is less than or equal to 1.5 m, in which, the distance between the first obstacle A and the first obstacle B is 0.4 m, the distance between the first obstacle A and the first obstacle C is 0.3 m, and the distance between the first obstacle A and the first obstacle D is 0.5 m, the distance between the first obstacle B and the first obstacle D is 0.3 m, the distance between the first obstacle B and the first obstacle C is 0.5 m, the distance between the first obstacle C and the first obstacle D is 0.4 m. It can be seen that the first obstacle A, the first obstacle B and the first obstacle C can form a triangle of size 0.3, 0.4 and 0.5. The first obstacle B, the first obstacle C and the first obstacle D can form a triangle of size 0.3, 0.4 and 0.5. The first obstacle A, the first obstacle C and the first obstacle D can form a triangle of size 0.3, 0.4 and 0.5. The first obstacle A, the first obstacle B and the first obstacle D can form a triangle of size 0.3, 0.4 and 0.5. The first obstacle A, the first obstacle B, the first obstacle C and the first obstacle D can form a rectangle of length and width of 0.3 and 0.4. The triangles and the rectangle are closed geometries, that is, S is 5. The sizes of the 5 closed geometries are matched with the sizes of various pieces of furniture in the preset furniture size database. Since the preset furniture size database includes the stool of the size of length and width of 0.3 and 0.4, it can be known that the closed geometry matched with the furniture is the rectangle of length and width of 0.3 and 0.4, that is, the 4 first obstacles can match one piece of furniture (the stool).

Supposing the terminal obtains 1 second obstacle, that is, M is 1. The position of the second obstacle may be a relative position of the second obstacle in the room, that is, may include the distance between the second obstacle and each wall of the room and a ratio of the second obstacle to a length of each wall of the room. According to the shape of the second obstacle, the relative position of the second obstacle in the room and the size of the room, the size of the object represented by the second obstacle can be obtained. For example, the room is rectangular, the length and width of which are 4 m and 3 m; the second obstacle is located at one corner of the room, the shape of the second obstacle is rectangular, a ratio of the length of the second obstacle to the length of the room is ½, and a ratio of the width of the second obstacle to the width of the room is ⅗, then it can be seen that the size of the object represented by the second obstacle is 2 m*1.8 m. The size of the object is matched with the sizes of the various pieces of furniture in the preset furniture size database, and it can be known that the furniture matching with the size of the object is the bed.

In the technical solutions of aspects of the present disclosure, the terminal can determine the sizes of different objects according to the positions and/or shapes of different obstacles, and then obtain the appropriate furniture by matching according to the sizes of the objects, improving accuracy of determining the furniture.

In an aspect, when determining the Q pieces of furniture arranged in the room according to the sizes of S closed geometries, the sizes of M objects and a preset furniture size database, the multiple options of each of the Q pieces of furniture arranged in the room can be first determined and arranged according to the sizes of S closed geometries, the sizes of M objects and a preset furniture size database first. Then, a selecting operation instruction can be obtained, in which the selecting operation instruction includes a specified option of each piece of furniture determined in the plurality of options of the piece of furniture. According to the specified option of each piece of furniture, the Q pieces of furniture arranged in the room can be obtained.

In an exemplary aspect, due to a diversity of the furniture, the furniture of the same size may be of multiple types or styles. In order to make the layout fit actual layout of the room, when the terminal matches the obtained sizes of objects with the preset furniture size database, it is possible to output multiple options for the furniture corresponding to each object, and display the options corresponding to each object on a terminal screen. The user can read the multiple options for each object, and then select one specified option satisfying the actual situation from the multiple options. The terminal can determine the furniture arranged in the room according to the specified option selected by the user.

Figure 1C:
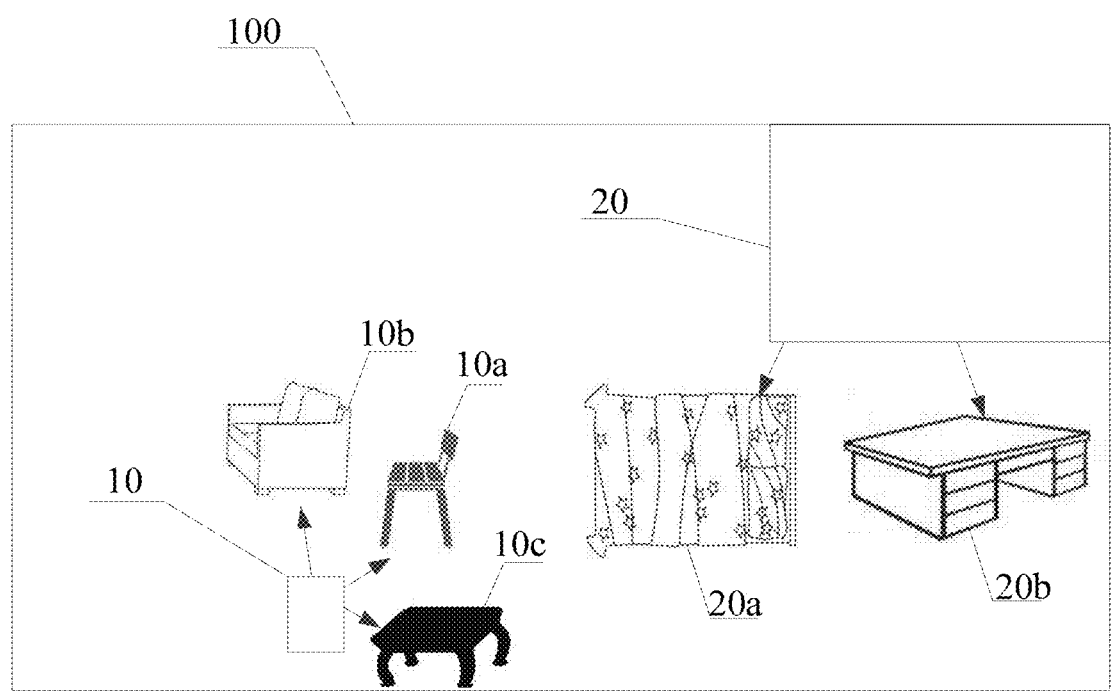
FIG. 1C is a room layout diagram displayed with furniture options according to an exemplary aspect of the present disclosure.

For example, the terminal determines 3 options of the furniture according to the closed geometry of the length and width of 0.4 m*0.3 m and the preset furniture size database, that is, a stool, a small sofa and a small table respectively, and determines 2 options of the furniture according to the object of the size of 2 m*1.8 m and the preset furniture size database, that is, a bed and a large desk respectively. As illustrated in FIG. 1c, the terminal can display an original plan 100 of the room on the screen, and set images of the stool 10a, the small sofa 10b and the small table 10c around the position of the closed geometry 10 of the length and width of 0.4 m*0.3 m, and set images of the bed 20a and the large desk 20b around the position of the object of the size of 2 m*1.8 m. The user can select the specified option of the closed geometry 10 from the stool 10a, the small sofa 10b and the small table 10c. For example, the user selects the stool 10a as the furniture corresponding to the closed geometry 10 according to actual situation of the room, and then the user can click the image of the stool 10a. The terminal may use the stool 10a as the specified option of the furniture corresponding to the closed geometry 10 after detecting the click. At the same time, the user selects the bed 20a as the furniture corresponding to the object of the size of 2 m*1.8 m according to the actual situation of the room, and then the user can click the image of the bed 20a. The terminal may use the bed 20a as the specified option of the furniture corresponding to the object of the size of 2 m*1.8 m after detecting the click. At this time, according to the specified option of the furniture corresponding to the object of the size of 0.4 m*0.3 m and the specified option of the furniture corresponding to the object of the size of 2 m*1.8 m, the terminal can determine the two pieces of furniture arranged in the room as the stool and the bed.

Figure 1D:
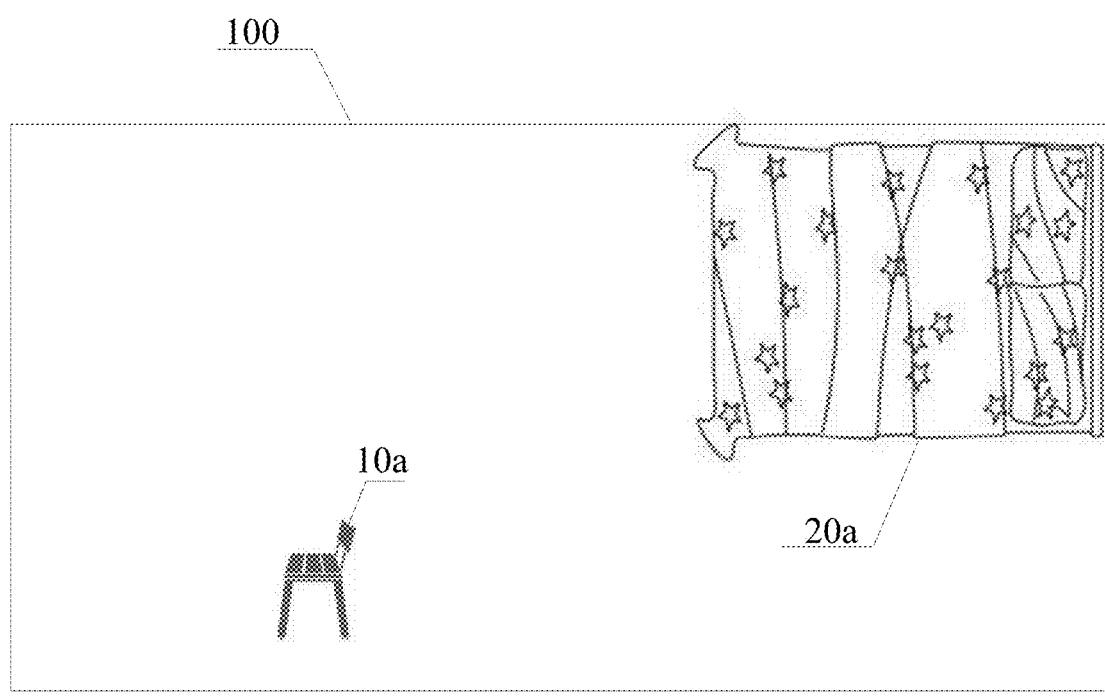
FIG. 1D is a room layout diagram according to an exemplary aspect of the present disclosure.

After determining that the two pieces of furniture arranged in the room are the stool and the bed, the terminal can draw the layout of the room. As illustrated in FIG. 1d, according to the position of the closed geometry 10, the stool 10a is marked on the plan 100 of the room, and according to the position of the object 20, the bed 20a is marked on the plan 100 of the room. Thus, the layout of the room can be obtained.

In the technical solutions of aspects of the present disclosure, when determining multiple options of the furniture according to the size of the object, the terminal can display the multiple options on the screen to facilitate the user to select the specified option of the furniture corresponding to the object from the multiple options, thus improving flexibility and accuracy of drawing the layout, and improving user experience.

Figure 1E:
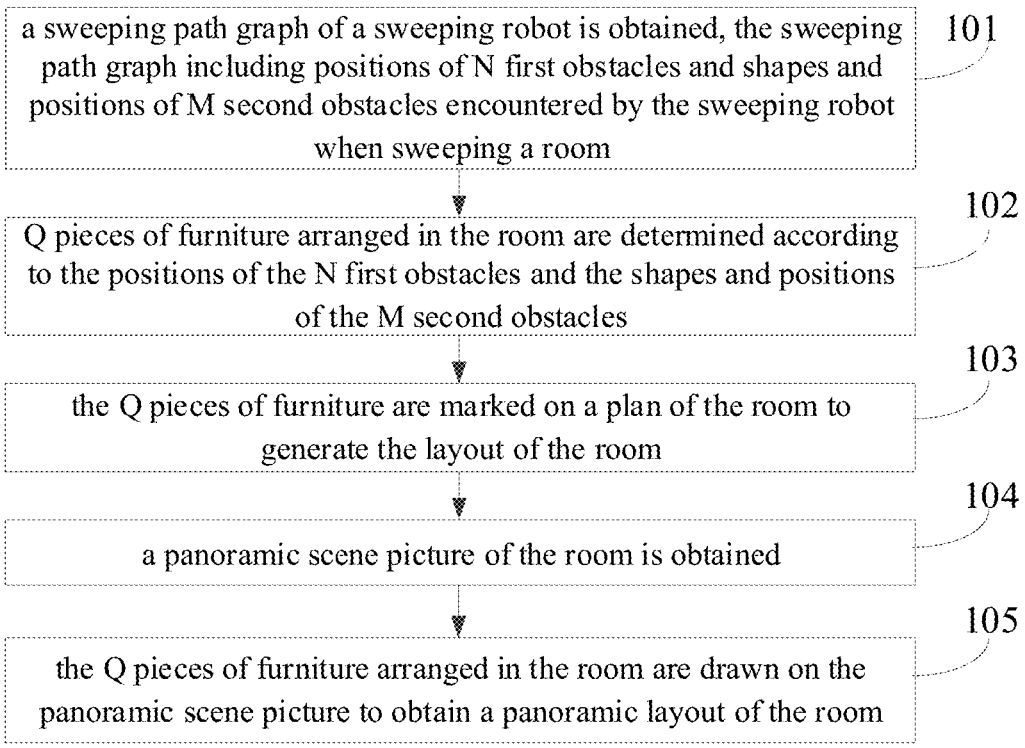
FIG. 1E is a flow chart illustrating a method for drawing a room layout according to an exemplary aspect of the present disclosure.

In an aspect, as illustrated in FIG. 1e, the method further includes block 104 and block 105.

In block 104, a panoramic scene picture of the room is obtained.

In block 105, the Q pieces of furniture arranged in the room are drawn on the panoramic scene picture, and a panoramic layout of the room is obtained.

In an exemplary aspect, the terminal can obtain multiple pictures of the room by adjusting a shooting angle and a focal length of a camera, and then obtain the panoramic scene picture of the room by synthesizing the multiple pictures. The panoramic scene picture can wholly reflect an environment of the room in a surrounding angle. Then, the Q pieces of furniture arranged in the room are drawn on the panoramic scene picture to obtain the panoramic layout of the room. The panoramic layout can also wholly reflect the furniture arranged in the room in a surrounding angle, improving an appreciation of the layout.

The aspects described above are also applicable to the technical solutions illustrated in FIG. 1b.

In the technical solutions of aspects of the present disclosure, the terminal can display the determined Q pieces of furniture on the panoramic scene picture of the room, improving an appreciation of the layout, and improving user experience.

Robot Side

Figure 2:
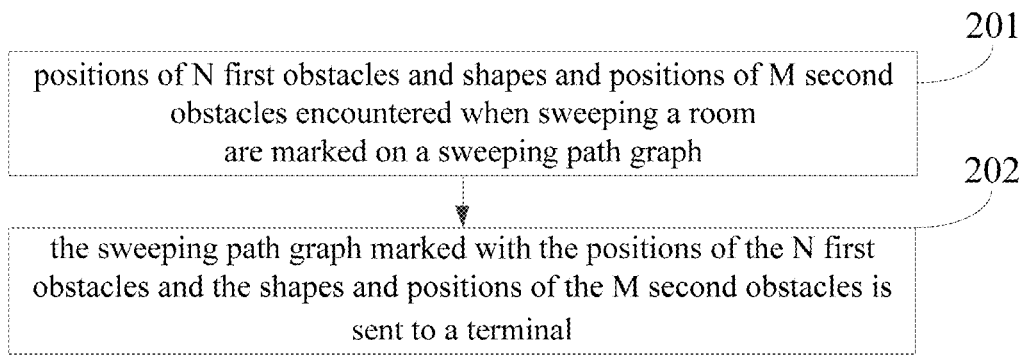
FIG. 2 is a flow chart illustrating a method for drawing a room layout according to an exemplary aspect of the present disclosure.

FIG. 2 is a flow chart illustrating a method for drawing a room layout according to an exemplary aspect. As illustrated in FIG. 2, the method for drawing the room layout is applied in the sweeping robot, including block 201 and block 202.

In block 201, positions of N first obstacles and shapes and positions of M second obstacles encountered when sweeping a room are marked on a sweeping path graph.

A bottom area of the first obstacle is less than or equal to a first preset threshold, and a bottom area of the second obstacle is greater than or equal to a second preset threshold, where N and M are integers greater than or equal to 0.

In an exemplary aspect, the sweeping robot may encounter multiple obstacles during sweeping the room. Some obstacles are fixed obstacles, such as an edge of the furniture, or a supporting part of the furniture. Some obstacles are movable obstacles, such as feet of the user, or legs of a pet. In order to avoid marking some movable obstacles on the sweeping path graph and causing an inaccuracy of drawing the room layout, the sweeping robot can determine the number of times of encountering the obstacle first before marking the obstacle. When the number of times of encountering the obstacle at the same position is large, it indicates that the obstacle is the fixed obstacle and can be marked on the sweeping path graph.

Take a reference obstacle as an example, the sweeping robot may be provided with a counter corresponding to the reference obstacle. Each time encountering the reference obstacle, the sweeping robot instructs the counter to add 1, and determines whether data recorded in the counter is greater than or equal to the preset number of times. When the data recorded in the counter is greater than or equal to the preset number of times, it indicates that the number of times the sweeping robot encounters the reference obstacle is great, and the reference obstacle can be considered as the fixed obstacle. At this time, the sweeping robot can obtain the bottom area of the reference obstacle. When the bottom area of the reference obstacle is large, that is, is greater than or equal to the second preset threshold, the shape and position of the reference obstacle can be obtained according to scanned image, and the reference obstacle may be marked on the sweeping path graph in a form of the second obstacle. When the bottom area of the reference obstacle is small, that is, is less than or equal to the first preset threshold, the position of the reference obstacle can be obtained according to the scanned image, and the reference obstacle may be marked on the sweeping path graph in a form of the first obstacle.

Specifically, the sweeping robot can estimate the length and width of the bottom of the reference obstacle according to the scanned image, and then obtain the bottom area of the reference obstacle. The bottom area of the first obstacle may be the contact area of the first obstacle with the ground, and the bottom area of the second obstacle may be the contact area of the second obstacle with the ground. In practical applications, the first preset threshold and the second preset threshold may be set according to the specific situations, which are not limited in aspects of the present disclosure. Alternatively, the first preset threshold is less than the second preset threshold.

In block 202, the sweeping path graph marked with the positions of the N first obstacles and the shapes and positions of the M second obstacles is sent to a terminal.

In an exemplary aspect, the sweeping robot may be connected with the terminal via infrared, Bluetooth, or wireless communication networks. After obtaining the sweeping path graph marked with the positions of the N first obstacles and the shapes and positions of the M second obstacles, the sweeping path graph can be sent to the terminal through the connection path to facilitate the terminal to draw the layout of the room.

In the technical solutions of aspects of the present disclosure, the sweeping robot can mark the obstacles encountered in sweeping the room on the sweeping path graph, and send the sweeping path graph to the terminal to facilitate the terminal to draw the layout of the room, improving convenience and accuracy of drawing layout of the room, and improving user experience.

Implementation process is described in detail through following aspects.

Figure 3:
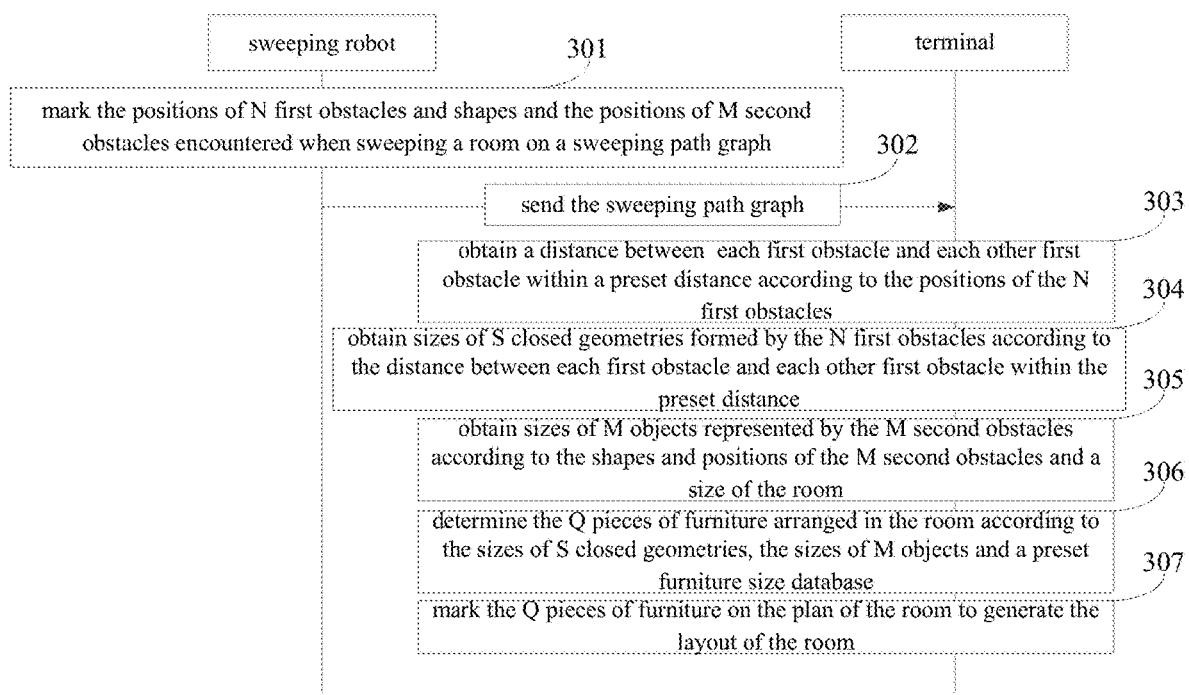
FIG. 3 is an interaction diagram illustrating a method for drawing a room layout according to an exemplary aspect of the present disclosure.

FIG. 3 is an interaction diagram illustrating a method for drawing a room layout according to an exemplary aspect. As illustrated in FIG. 3, the method includes following block 301 to block 307.

In block 301, the sweeping robot marks the positions of N first obstacles and shapes and the positions of M second obstacles encountered when sweeping a room on a sweeping path graph.

In block 302, the sweeping robot sends the sweeping path graph marked with the positions of the N first obstacles and the shapes and positions of the M second obstacles to a terminal.

In block 303, the terminal obtains a distance between each first obstacle and each other first obstacle within a preset distance according to the positions of the N first obstacles.

In block 304, the terminal obtains sizes of S closed geometries formed by the N first obstacles according to the distance between other first obstacles within the preset distance and the each first obstacle.

In block 305, the terminal determines sizes of M objects represented by the M second obstacles according to the shapes and positions of the M second obstacles and a size of the room.

In block 306, the terminal determines the Q pieces of furniture arranged in the room according to the sizes of S closed geometries, the sizes of M objects and a preset furniture size database.

In block 307, the terminal marks the Q pieces of furniture on the plan of the room to generate the layout of the room.

With the method for drawing the room layout according to aspects of the present disclosure, the terminal can determine the furniture arranged in the cleaned room according to the sweeping path graph sent by the sweeping robot and the obstacles marked on the sweeping path graph, improving convenience and accuracy of drawing the layout of the room, and improving user experience.

Figure 4:
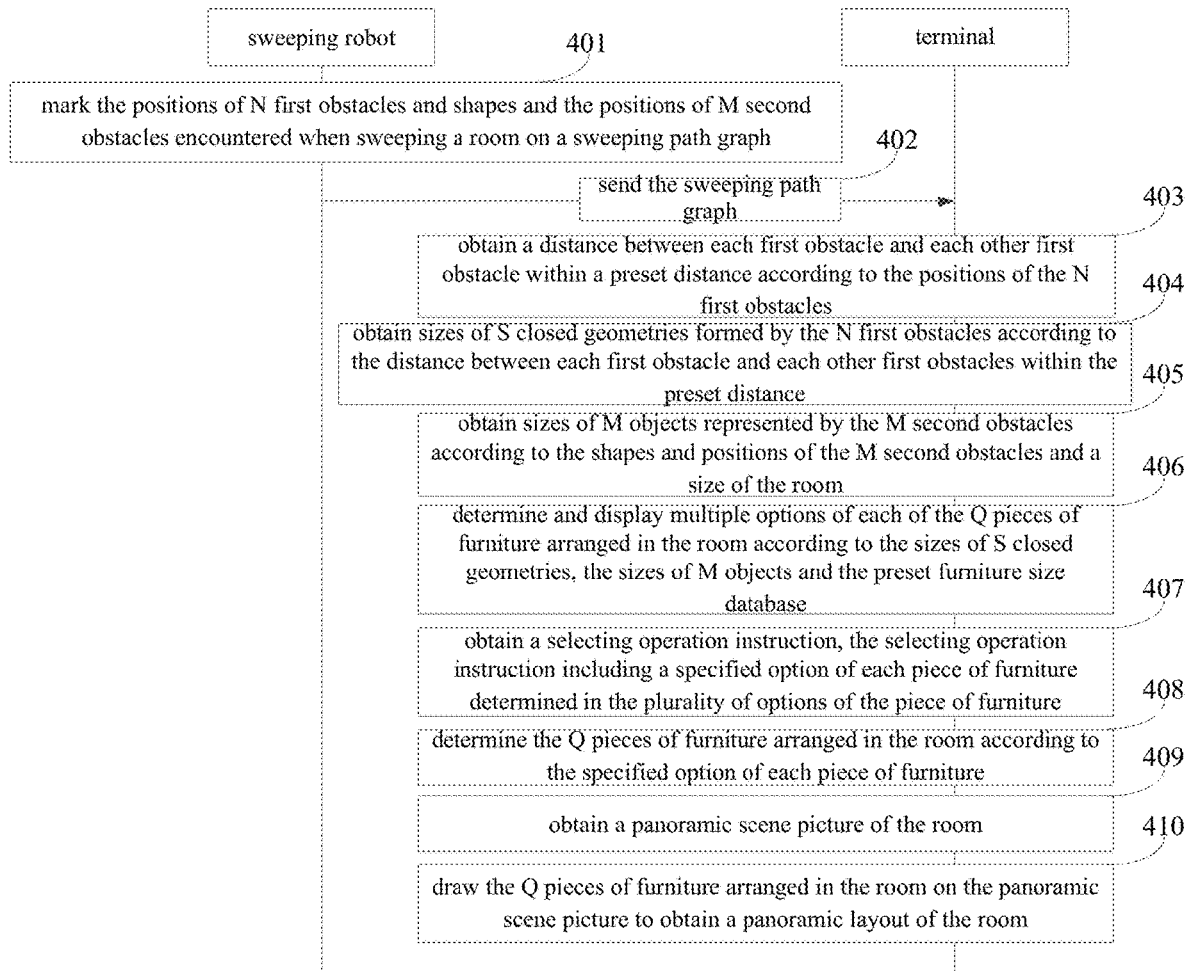
FIG. 4 is an interaction diagram illustrating a method for drawing a room layout according to an exemplary aspect of the present disclosure.

FIG. 4 is an interaction diagram illustrating a method for drawing a room layout according to an exemplary aspect. As illustrated in FIG. 4, the method includes block 401 to block 410.

In block 401, the sweeping robot marks the positions of N first obstacles and shapes and the positions of M second obstacles encountered when sweeping a room on a sweeping path graph.

In block 402, the sweeping robot sends the sweeping path graph marked with the positions of the N first obstacles and the shapes and positions of the M second obstacles to a terminal.

In block 403, the terminal obtains a distance between each first obstacle and each other first obstacle within a preset distance according to the positions of the N first obstacles.

In block 404, the terminal obtains sizes of S closed geometries formed by the N first obstacles according to the distance between each first obstacle and each other first obstacle within the preset distance.

In block 405, the terminal determines sizes of M objects represented by the M second obstacles according to the shapes and positions of the M second obstacles and a size of the room.

In block 406, the terminal determines and displays multiple options of each of the Q pieces of furniture arranged in the room according to the sizes of S closed geometries, the sizes of M objects and the preset furniture size database.

In block 407, the terminal obtains a selecting operation instruction, in which the selecting operation instruction includes a specified option of each piece of furniture determined in the plurality of options of the piece of furniture.

In block 408, the terminal determines the Q pieces of furniture arranged in the room according to the specified option of each piece of furniture.

In block 409, the terminal obtains a panoramic scene picture of the room.

In block 410, the terminal draws the Q pieces of furniture arranged in the room on the panoramic scene picture to obtain a panoramic layout of the room.

With the method for drawing the room layout according to aspects of the present disclosure, the terminal can determine the furniture arranged in the cleaned room according to the sweeping path graph sent by the sweeping robot and the obstacles marked on the sweeping path graph, improving convenience and accuracy of drawing the layout of the room, and improving user experience.

The followings are device aspects of the present disclosure, which are configured to implement the method aspects of the present disclosure.

Figure 5A:
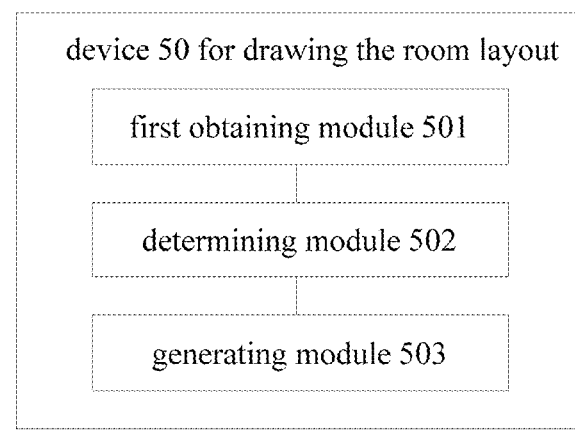
FIG. 5A is a block diagram illustrating a device for drawing a room layout according to an exemplary aspect of the present disclosure.

FIG. 5a is a block diagram illustrating a device 50 for drawing a room layout according to an exemplary aspect. The device 50 may be implemented as part or all of an electronic device by software, hardware, or a combination thereof. As illustrated in FIG. 5a, the device 50 for drawing the room layout includes a first obtaining module 501, a determining module 502 and a generating module 503.

The first obtaining module 501 is configured to obtain a sweeping path graph of a sweeping robot. The sweeping path graph includes positions of N first obstacles and shapes and positions of M second obstacles encountered by the sweeping robot when sweeping a room. A bottom area of the first obstacle is less than or equal to a first preset threshold, and a bottom area of the second obstacle is greater than or equal to a second preset threshold, where N and M are integers greater than or equal to 0.

The determining module 502 is configured to determine Q pieces of furniture arranged in the room according to the positions of the N first obstacles and the shapes and positions of the M second obstacles, where Q is an integer greater than or equal to 0 and less than or equal to (N+M).

The generating module 503 is configured to mark the Q pieces of furniture on a plan of the room to generate the layout of the room.

In an aspect, the first preset threshold is less than the second preset threshold.

Figure 5B:
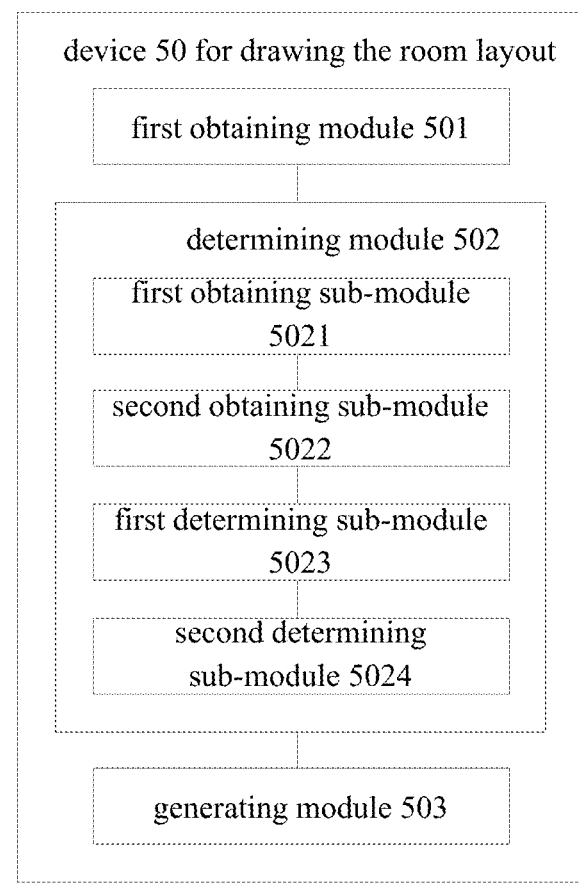
FIG. 5B is a block diagram illustrating a device for drawing a room layout according to an exemplary aspect of the present disclosure.

In an aspect, as illustrated in FIG. 5b, the determining module 502 includes a first obtaining sub-module 5021, a second obtaining sub-module 5022, a first determining sub-module 5023, and a second determining sub-module 5024.

The first obtaining sub-module 5021 is configured to obtain a distance between each first obstacle and each other first obstacle within a preset distance according to the positions of the N first obstacles.

The second obtaining sub-module 5022 is configured to obtain sizes of S closed geometries formed by the N first obstacles according to the distance between each first obstacle and each other first obstacle within the preset distance.

The first determining sub-module 5023 is configured to determine sizes of M objects represented by the M second obstacles according to the shapes and positions of the M second obstacles and a size of the room.

The second determining sub-module 5024 is configured to determine the Q pieces of furniture arranged in the room according to the sizes of S closed geometries, the sizes of M objects and a preset furniture size database.

Figure 5C:
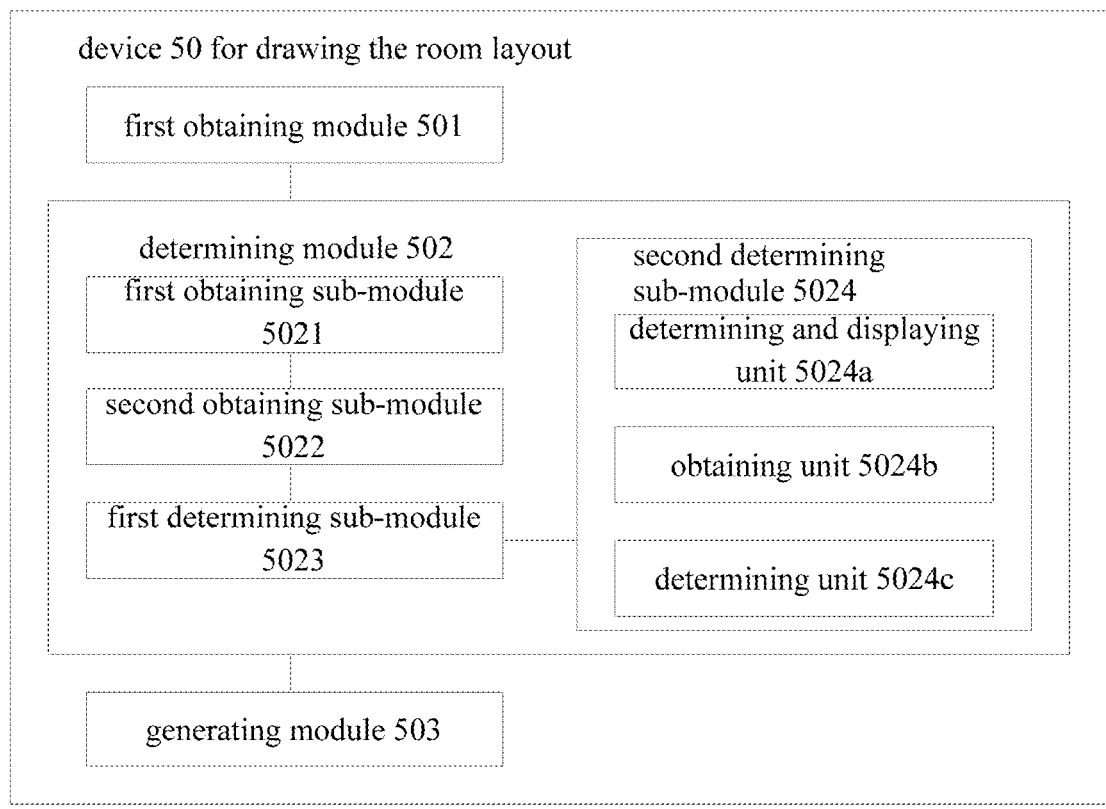
FIG. 5C is a block diagram illustrating a device for drawing a room layout according to an exemplary aspect of the present disclosure.

In an aspect, as illustrated in FIG. 5c, the second determining sub-module 5024 includes a determining and displaying unit 5024a, an obtaining unit 5024b, and a determining unit 5024c.

The determining and displaying unit 5024a is configured to determine and display a plurality of options of each of the Q pieces of furniture arranged in the room according to the sizes of S closed geometries, the sizes of M objects and the preset furniture size database.

The obtaining unit 5024b is configured to obtain a selecting operation instruction, the selecting operation instruction including a specified option of each piece of furniture determined in the plurality of options of the piece of furniture.

The determining unit 5024c is configured to determine the Q pieces of furniture arranged in the room according to the specified option of each piece of furniture.

Figure 5D:
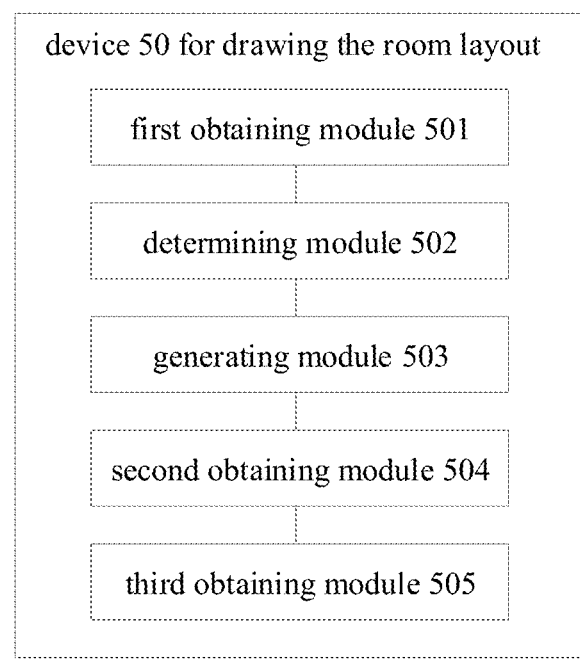
FIG. 5D is a block diagram illustrating a device for drawing a room layout according to an exemplary aspect of the present disclosure.

In an aspect, as illustrated in FIG. 5d, the device 50 further includes a second obtaining module 504 and a third obtaining module 505.

The second obtaining module 504 is configured to obtain a panoramic scene picture of the room.

The third obtaining module 505 is configured to draw the Q pieces of furniture arranged in the room on the panoramic scene picture to obtain a panoramic layout of the room.

Aspects of the present disclosure provide a device for drawing the layout of the room, which can determine the furniture arranged in the cleaned room according to the sweeping path graph sent by the sweeping robot and the obstacles marked on the sweeping path graph, improving convenience and accuracy of drawing the layout of the room, and improving user experience.

Figure 6A:
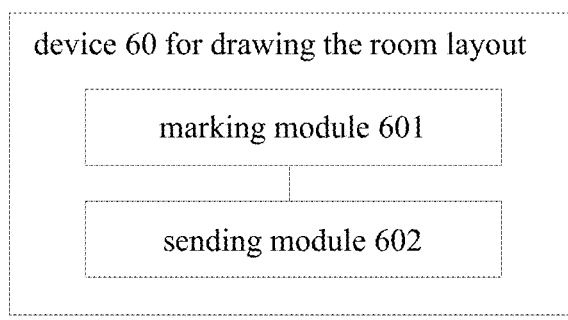
FIG. 6A is a block diagram illustrating a device for drawing a room layout according to an exemplary aspect of the present disclosure.

FIG. 6a is a block diagram illustrating a device 60 for drawing a room layout according to an exemplary aspect. The device 60 may be implemented as part or all of an electronic device by software, hardware, or a combination thereof. As illustrated in FIG. 6a, the device 60 for drawing the room layout includes a marking module 601 and a sending module 602.

The marking module 601 is configured to mark positions of N first obstacles and shapes and positions of M second obstacles encountered when sweeping a room on a sweeping path graph. A bottom area of the first obstacle is less than or equal to a first preset threshold, and a bottom area of the second obstacle is greater than or equal to a second preset threshold, where N and M are integers greater than or equal to 0.

The sending module 602 is configured to send the sweeping path graph marked with the positions of the N first obstacles and the shapes and positions of the M second obstacles to a terminal.

In an aspect, the first preset threshold is less than the second preset threshold.

Figure 6B:
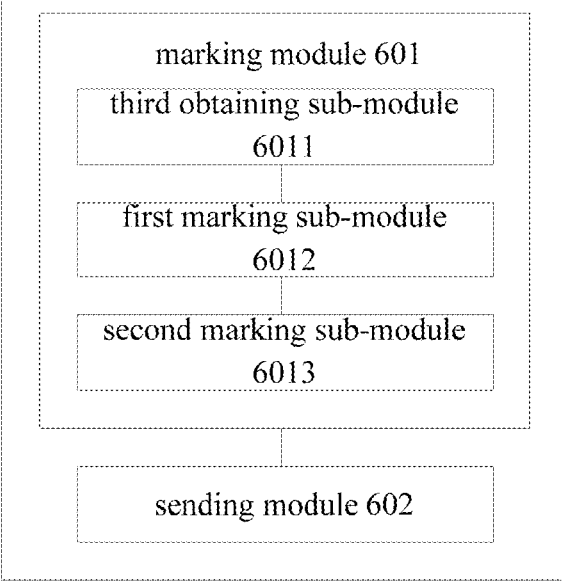
FIG. 6B is a block diagram illustrating a device for drawing a room layout according to an exemplary aspect of the present disclosure.

In an aspect, as illustrated in FIG. 6b, the marking module 601 includes a third obtaining sub-module 6011, a first marking sub-module 6012 and a second marking sub-module 6013.

The third obtaining sub-module 6011 is configured to obtain a bottom area of a reference obstacle when the number of times of encountering the reference obstacle when sweeping the room is greater than or equal to the preset number of times.

The first marking sub-module 6012 is configured to, when the bottom area of the reference obstacle is less than or equal to the first preset threshold, mark the reference obstacle as the first obstacle on the sweeping path graph according to a position of the reference obstacle.

The second marking sub-module 6013 is configured to, when the bottom area of the reference obstacle is greater than or equal to the second preset threshold, mark the reference obstacle as the second obstacle on the sweeping path graph according to a shape of the reference obstacle and the position of the reference obstacle.

Aspects of the present disclosure provide a device for drawing the layout of the room, which can marks the obstacles encountered when sweeping the room on the sweeping path graph and sends the sweeping path graph to the terminal, such that the terminal can draw the layout of the room, thus improving convenience and accuracy of drawing the layout of the room, and improving user experience.

Aspects of the present disclosure provides a device for drawing a room layout, and the device for drawing the room layout includes a first processor and a first memory. The first memory is configured to store instructions executable by the first processor.

The first processor is configured to: obtain a sweeping path graph of a sweeping robot, the sweeping path graph including positions of N first obstacles and shapes and positions of M second obstacles encountered by the sweeping robot when sweeping a room, a bottom area of the first obstacle being less than or equal to a first preset threshold, and a bottom area of the second obstacle being greater than or equal to a second preset threshold, where N and M are integers greater than or equal to 0; determine Q pieces of furniture arranged in the room according to the positions of the N first obstacles and the shapes and positions of the M second obstacles, where Q is an integer greater than or equal to 0 and less than or equal to (N+M); and mark the Q pieces of furniture on a plan of the room to generate the layout of the room.

In an aspect, the first preset threshold is less than the second preset threshold.

In an aspect, the first processor is further configured to obtain a distance between each first obstacle and each other first obstacle within a preset distance according to the positions of the N first obstacles; obtain sizes of S closed geometries formed by the N first obstacles according to the distance between each first obstacle and each other first obstacle within the preset distance; determine sizes of M objects represented by the M second obstacles according to the shapes and positions of the M second obstacles and a size of the room; and determine the Q pieces of furniture arranged in the room according to the sizes of S closed geometries, the sizes of M objects and a preset furniture size database.

In an aspect, the first processor is further configured to: determine and display a plurality of options of each of the Q pieces of furniture arranged in the room according to the sizes of S closed geometries, the sizes of M objects and the preset furniture size database; obtain a selecting operation instruction, the selecting operation instruction including a specified option of each piece of furniture determined in the plurality of options of each piece of furniture; and determine the Q pieces of furniture arranged in the room according to the specified option of each piece of furniture.

In an aspect, the first processor is further configured to: obtain a panoramic scene picture of the room; and draw the Q pieces of furniture arranged in the room on the panoramic scene picture to obtain a panoramic layout of the room.

With the device for drawing the room layout according to aspects of the present disclosure, the device can determine the furniture arranged in the cleaned room according to the sweeping path graph sent by the sweeping robot and the obstacles marked on the sweeping path graph, improving convenience and accuracy of drawing the layout of the room, and improving user experience.

Aspects of the present disclosure provide a device for drawing a room layout, and the device for drawing the room layout includes a second processor and a second memory. The second memory is configured to store instructions executable by the second processor.

The second processor is configured to: mark positions of N first obstacles and shapes and positions of M second obstacles encountered when sweeping a room on a sweeping path graph, a bottom area of the first obstacle being less than or equal to a first preset threshold, and a bottom area of the second obstacle being greater than or equal to a second preset threshold, where N and M are integers greater than or equal to 0; and send the sweeping path graph marked with the positions of the N first obstacles and the shapes and positions of the M second obstacles to a terminal.

In an aspect, the first preset threshold is less than the second preset threshold.

In an aspect, the second processor is further configured to obtain a bottom area of a reference obstacle when the number of times of encountering the reference obstacle when sweeping the room is greater than or equal to the preset number of times; when the bottom area of the reference obstacle is less than or equal to the first preset threshold, mark the reference obstacle as the first obstacle on the sweeping path graph according to a position of the reference obstacle; and when the bottom area of the reference obstacle is greater than or equal to the second preset threshold, mark the reference obstacle as the second obstacle on the sweeping path graph according to a shape of the reference obstacle and the position of the reference obstacle.

With the device for drawing the room layout according to aspects of the present disclosure, the device can mark the obstacles encountered when sweeping the room on the sweeping path graph and send the sweeping path graph to the terminal, such that the terminal can draw the layout of the room, improving convenience and accuracy of drawing the layout of the room, and improving user experience.

With respect to the devices in the above aspects, the specific manners for performing operations for individual modules therein have been described in detail in the aspects regarding the methods for drawing a room layout, which will not be elaborated herein.

Figure 7:
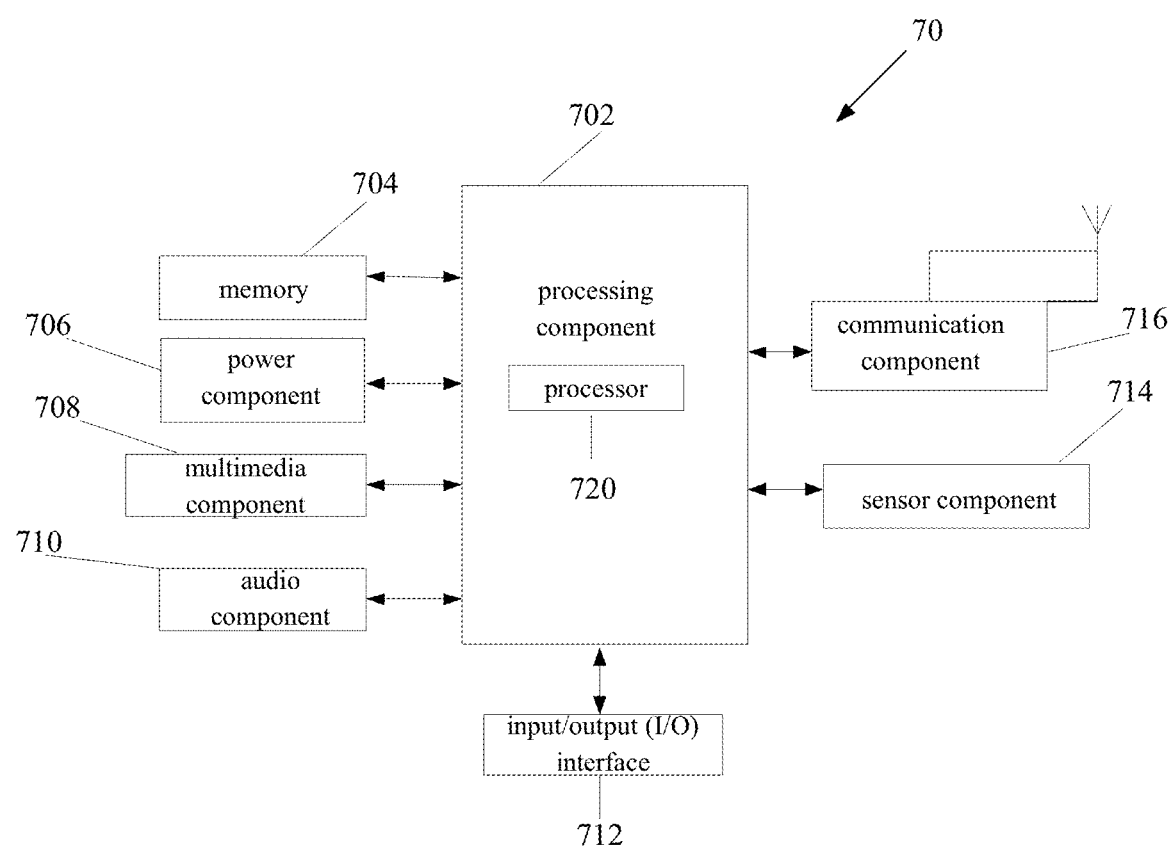
FIG. 7 is a schematic diagram illustrating a device for drawing a room layout according to an exemplary aspect of the present disclosure.

FIG. 7 is a schematic diagram illustrating a device 70 for drawing a room layout according to an exemplary aspect. The device 70 is applicable to a terminal device. For example, the device 70 may be a mobile phone, a computer, a digital broadcasting terminal, a message transceiver device, a game console, a tablet device, a medical device, a fitness device and a personal digital assistant.

The device 70 may include one or more of the following components: a processing component 702, a memory 704, a power component 706, a multimedia component 707, an audio component 710, an input/output (I/O) interface 712, a sensor component 714, and a communication component 716.

The processing component 702 typically controls overall operations of the device 70, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 70. Examples of such data include instructions for any applications or methods operated on the device 70, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 70. The power component 706 may include a power management system, one or more power sources, and any other components associated with the generation, management, and distribution of power in the device 70.

The multimedia component 708 includes a screen providing an output interface between the device 70 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 708 includes a front-facing camera and/or a rear-facing camera. When the device 70 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 710 is configured to output and/or input audio signals. For example, the audio component 710 includes a microphone ("MIC") configured to receive an external audio signal when the device 70 is in an operation mode, such as a call mode, a recording mode, and a voice recognition mode. The received audio signal may be further stored in the memory 704 or transmitted via the communication component 716. In some aspects, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 70. For instance, the sensor component 714 may detect an open/closed status of the device 70, relative positioning of components, e.g., the display and the keypad, of the device 70, a change in position of the device 70 or a component of the device 70, a presence or absence of user contact with the device 70, an orientation or an acceleration/deceleration of the device 70, and a change in temperature of the device 70. The sensor component 714 may include a proximity sensor configured to detect the presence of nearby objects without any physical contact. The sensor component 714 may also include a light sensor, such as a CMOS or CCD image sensor, for use in imaging applications. In some aspects, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 70 and other devices. The device 70 can access a wireless network based on a communication standard, such as WiFi, 2G; or 3G or a combination thereof. In one exemplary aspect, the communication component 716 receives a broadcast signal or broadcast associated information from an external broadcast management system via a broadcast channel. In one exemplary aspect, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the device 70 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary aspects, there is also provided a non-transitory computer-readable storage medium including instructions, such as included in the memory 704, executable by the processor 720 in the device 70, for performing the above-described methods. For example, the non-transitory computer-readable storage medium may be a ROM, a RAM, a CD-ROM, a magnetic tape, a floppy disc, an optical data storage device, and the like.

Figure 8:
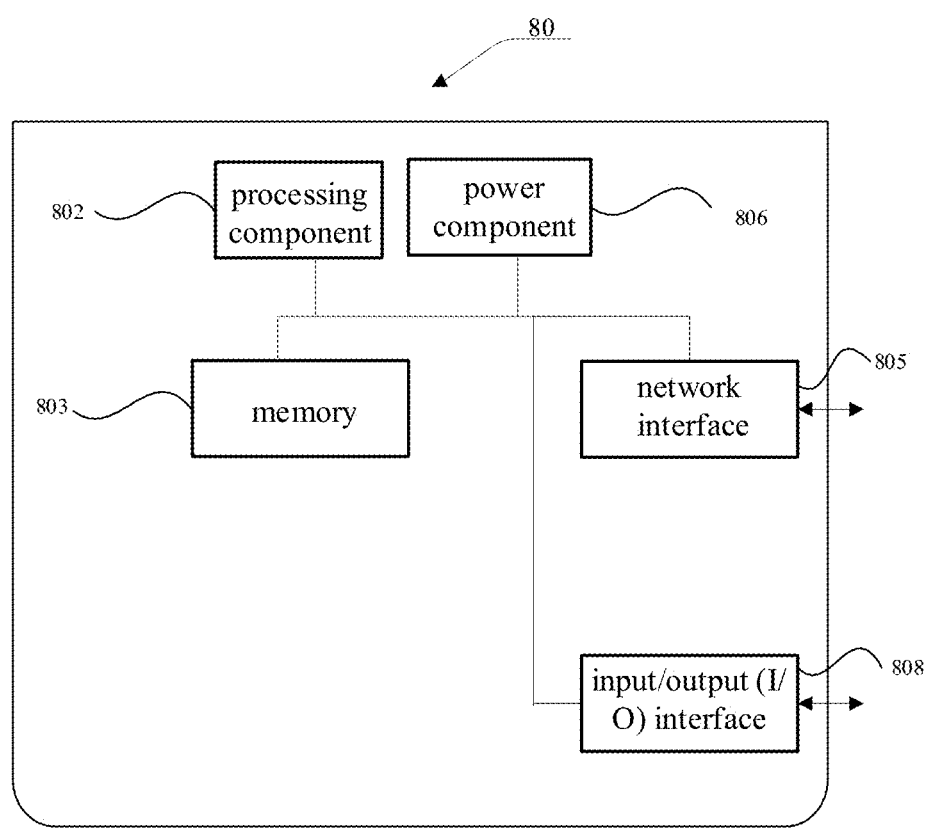
FIG. 8 is a schematic diagram illustrating a device for drawing a room layout according to another exemplary aspect of the present disclosure.

FIG. 8 is a schematic diagram illustrating a device 80 for drawing a room layout according to another exemplary aspect. The device 80 includes a processing component 802, and the processing component 802 further includes one or more processors and a memory resource represented by a memory 803. The memory resource is configured to store instructions executable by the processing component 802, such as application programs. The application program stored in the memory 803 may include one or more modules corresponding to a set of instructions. In addition, the processing component 802 is configured to execute instructions to execute the method illustrated in FIG. 2.

The device further includes a power component 806 configured to execute power management of the device 80, a wired or wireless network interface 805 configured to connect the device 80 to the network, and an input/output (I/O) interface 808. The device 80 may operate based on an operating system stored in the memory 803, such as Windows Server™, Mac OS X™, Unix™, Linux™, Free BSD™, or the like.

Aspects of the present disclosure provide a non-transitory computer readable storage medium. When instructions in the storage medium are executed by the processor of the device 70, the device 70 can execute the method for drawing a room layout in the terminal side.

The method includes: obtaining a sweeping path graph of a sweeping robot, the sweeping path graph including positions of N first obstacles and shapes and positions of M second obstacles encountered by the sweeping robot when sweeping a room, a bottom area of the first obstacle being less than or equal to a first preset threshold, and a bottom area of the second obstacle being greater than or equal to a second preset threshold, where N and M are integers greater than or equal to 0; determining Q pieces of furniture arranged in the room according to the positions of the N first obstacles and the shapes and positions of the M second obstacles, where Q is an integer greater than or equal to 0 and less than or equal to (N+M); and marking the Q pieces of furniture on a plan of the room to generate the layout of the room.

In an aspect, the first preset threshold is less than the second preset threshold.

In an aspect, determining Q pieces of furniture arranged in the room according to the positions of the N first obstacles and the shapes and positions of the M second obstacles includes: obtaining a distance between each first obstacle and each other first obstacle within a preset distance according to the positions of the N first obstacles; obtaining sizes of S closed geometries formed by the N first obstacles according to the distance between each first obstacle and each other first obstacle within the preset distance; determining sizes of M objects represented by the M second obstacles according to the shapes and positions of the M second obstacles and a size of the room; and determining the Q pieces of furniture arranged in the room according to the sizes of S closed geometries, the sizes of M objects and a preset furniture size database.

In an aspect, determining the Q pieces of furniture arranged in the room according to the sizes of S closed geometries, the sizes of M objects and a preset furniture size database includes: determining and displaying a plurality of options of each of the Q pieces of furniture arranged in the room according to the sizes of S closed geometries, the sizes of M objects and the preset furniture size database; obtaining a selecting operation instruction, the selecting operation instruction including a specified option of each piece of furniture determined in the plurality of options of each piece of furniture; and determining the Q pieces of furniture arranged in the room according to the specified option of each piece of furniture.

In an aspect, the method further includes: obtaining a panoramic scene picture of the room; and drawing the Q pieces of furniture arranged in the room on the panoramic scene picture to obtain a panoramic layout of the room.

Aspects of the present disclosure provide another non-transitory computer readable storage medium. When instructions in the storage medium are executed by the processor of the device 80, the device 80 can execute the method for drawing a room layout in the robot side.

The method includes: marking positions of N first obstacles and shapes and positions of M second obstacles encountered when sweeping a room on a sweeping path graph, a bottom area of the first obstacle being less than or equal to a first preset threshold, and a bottom area of the second obstacle being greater than or equal to a second preset threshold, where N and M are integers greater than or equal to 0; and sending the sweeping path graph marked with the positions of the N first obstacles and the shapes and positions of the M second obstacles to a terminal.

In an aspect, the first preset threshold is less than the second preset threshold.

In an aspect, marking positions of N first obstacles and shapes and positions of M second obstacles encountered when sweeping a room on a sweeping path graph includes: obtaining a bottom area of a reference obstacle when the number of times of encountering the reference obstacle when sweeping the room is greater than or equal to the preset number of times; when the bottom area of the reference obstacle is less than or equal to the first preset threshold, marking the reference obstacle as the first obstacle on the sweeping path graph according to a position of the reference obstacle; and when the bottom area of the reference obstacle is greater than or equal to the second preset threshold, marking the reference obstacle as the second obstacle on the sweeping path graph according to a shape of the reference obstacle and the position of the reference obstacle.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for drawing a room layout, comprising:
obtaining a sweeping path graph of a sweeping robot, the sweeping path graph comprising positions of N first obstacles and shapes and positions of M second obstacles encountered by the sweeping robot when sweeping a room, a bottom area of each of the N first obstacles being less than or equal to a first preset threshold, a bottom area of each of the M second obstacles being greater than or equal to a second preset threshold, wherein N and M are integers greater than or equal to 0;
determining Q pieces of furniture arranged in the room based on the positions of the N first obstacles and the shapes and the positions of the M second obstacles, wherein Q is an integer greater than or equal to 0 and less than or equal to (N+M); and
marking the Q pieces of furniture on a plan of the room to generate the layout of the room.

2. The method according to claim 1, wherein the first preset threshold is less than the second preset threshold.

3. The method according to claim 2, wherein determining the Q pieces of furniture arranged in the room based on the positions of the N first obstacles and the shapes and the positions of the M second obstacles comprises:
- obtaining a distance between each of the N first obstacles within a preset distance based on the positions of the N first obstacles;
- obtaining sizes of S closed geometries formed by the N first obstacles based on the distances between each of the N first obstacles within the preset distance;
- determining sizes of M objects represented by the M second obstacles based on the shapes and the positions of the M second obstacles and a size of the room; and
- determining the Q pieces of furniture arranged in the room based on the sizes of the S closed geometries, the sizes of the M objects, and a preset furniture size database.

4. The method according to claim 3, wherein determining the Q pieces of furniture arranged in the room based on the sizes of the S closed geometries, the sizes of the M objects, and the preset furniture size database comprises:
- determining and displaying a plurality of options for each piece of furniture arranged in the room based on the sizes of the S closed geometries, the sizes of the M objects, and the preset furniture size database;
- receiving a selecting operation instruction, the selecting operation instruction comprising a specified option of each piece of furniture determined in the plurality of options of each piece of furniture; and
- determining the Q pieces of furniture arranged in the room based on the specified option of each piece of furniture.

5. The method according to claim 1, further comprising:
obtaining a panoramic scene picture of the room; and
drawing the Q pieces of furniture arranged in the room on the panoramic scene picture to obtain a panoramic layout of the room.

6. A method for drawing a room layout, comprising:
- marking positions of N first obstacles and shapes and positions of M second obstacles encountered when sweeping a room on a sweeping path graph, a bottom area of each of the N first obstacles being less than or equal to a first preset threshold, a bottom area of each of the M second obstacles being greater than or equal to a second preset threshold, wherein N and M are integers greater than or equal to 0; and
- sending the sweeping path graph marked with the positions of the N first obstacles and the shapes and positions of the M second obstacles to a terminal.

7. The method according to claim 6, wherein the first preset threshold is less than the second preset threshold.

8. The method according to claim 6, wherein marking the positions of the N first obstacles and the shapes and the positions of the M second obstacles encountered when sweeping the room on the sweeping path graph comprises:
- when a number of times of encountering a reference obstacle when sweeping the room is greater than or equal to a preset number of times, obtaining a bottom area of the reference obstacle;
- when the bottom area of the reference obstacle is less than or equal to the first preset threshold, marking the reference obstacle as one of the N first obstacles on the sweeping path graph based on a position of the reference obstacle; and
- when the bottom area of the reference obstacle is greater than or equal to the second preset threshold, marking the reference obstacle as one of the M second obstacles on the sweeping path graph based on a shape of the reference obstacle and the position of the reference obstacle.

9. A device for drawing a room layout, comprising:
a processor; and
a memory configured to store instructions executable by the processor,
wherein the processor is configured to:
- obtain a sweeping path graph of a sweeping robot, the sweeping path graph comprising positions of N first obstacles and shapes and positions of M second obstacles encountered by the sweeping robot when sweeping a room, a bottom area of each of the N first obstacles being less than or equal to a first preset threshold, a bottom area of each of the M second obstacles being greater than or equal to a second preset threshold, wherein N and M are integers greater than or equal to 0;
- determine Q pieces of furniture arranged in the room based on the positions of the N first obstacles and the shapes and the positions of the M second obstacles, wherein Q is an integer greater than or equal to 0 and less than or equal to (N+M); and
- mark the Q pieces of furniture on a plan of the room to generate the layout of the room.

10. The device according to claim 9, wherein the first preset threshold is less than the second preset threshold.

11. The device according to claim 10, wherein the processor is configured to:
- obtain a distance between each of the N first obstacles within a preset distance based on the positions of the N first obstacles;
- obtain sizes of S closed geometries formed by the N first obstacles based on the distances between each of the N first obstacles within the preset distance;
- determine sizes of M objects represented by the M second obstacles based on the shapes and the positions of the M second obstacles and a size of the room; and
- determine the Q pieces of furniture arranged in the room based on the sizes of the S closed geometries, the sizes of the M objects and a preset furniture size database.

12. The device according to claim 11, wherein the processor is configured to:
- determine and display a plurality of options for each piece of furniture arranged in the room based on the sizes of the S closed geometries, the sizes of the M objects, and the preset furniture size database;
- receive a selecting operation instruction, the selecting operation instruction comprises a specified option of each piece of furniture determined in the plurality of options of each piece of furniture; and
- determine the Q pieces of furniture arranged in the room based on the specified option of each piece of furniture.

13. The device according to claim 9, wherein the processor is further configured to:
obtain a panoramic scene picture of the room; and
draw the Q pieces of furniture arranged in the room on the panoramic scene picture to obtain a panoramic layout of the room.

* * * * *